United States Patent [19]
Winkler et al.

[11] Patent Number: 6,163,712
[45] Date of Patent: Dec. 19, 2000

[54] INRUSH CURRENT LIMITER WITH OUTPUT VOLTAGE DETECTION FOR CONTROL OF INPUT CURRENT LEVEL AND ACTIVATION OF CURRENT BYPASS PATH

[75] Inventors: David Allen Winkler, Algonquin, Ill.; Ronald Gene Myers, Scottsdale, Ariz.

[73] Assignee: Motorola, Inc., Schaumburg, Ill.

[21] Appl. No.: 09/018,818

[22] Filed: Feb. 4, 1998

[51] Int. Cl.$^7$ ........................................ H04B 1/38
[52] U.S. Cl. .................. 455/572; 455/343; 455/127; 323/908
[58] Field of Search ............................. 455/572, 571, 455/573, 575, 226, 343, 127; 323/908; 327/309, 399

[56] References Cited

U.S. PATENT DOCUMENTS

| | | | |
|---|---|---|---|
| 3,996,506 | 12/1976 | Kichak | 317/13 |
| 4,396,882 | 8/1983 | Kellenbenz | 323/278 |
| 5,095,541 | 3/1992 | Aisaka et al. | 455/89 |
| 5,164,652 | 11/1992 | Johnson et al. | 455/226 |
| 5,187,653 | 2/1993 | Lorenz | 363/89 |
| 5,519,264 | 5/1996 | Heyden et al. | 323/908 |
| 5,559,660 | 9/1996 | Watson et al. | 361/58 |
| 5,886,892 | 3/1999 | Radley et al. | 363/126 |
| 5,991,175 | 11/1999 | Liu . | |
| 6,049,704 | 4/2000 | Peckham et al. | 455/127 |

*Primary Examiner*—Edward F. Urban
*Assistant Examiner*—Tilahun Gesesse
*Attorney, Agent, or Firm*—Paul J. Bartusiak

[57] ABSTRACT

According to the present disclosure, an inrush current limiter comprises an input (190) for connection to a supply voltage, an output (202) for connection to a load, a current limiter circuit (102), a current bypass circuit (106), and a charge status circuit (104). During the initial charging of capacitors, the current limiter circuit (102) senses a large inrush current and limits the current to a predetermined quantity. The current bypass circuit (106) is switched off during the initial charging of the capacitors. When the capacitors are charged to substantially equal the input voltage, the current bypass circuit (106) is switched on to provide a low-resistance path for the supply current to pass through. In addition, the charge status circuit (104) operates to indicate the supply voltage.

16 Claims, 2 Drawing Sheets

INRUSH CURRENT LIMITER WITH OUTPUT VOLTAGE DETECTION FOR CONTROL OF INPUT CURRENT LEVEL AND ACTIVATION OF CURRENT BYPASS PATH

FIELD OF THE INVENTION

This invention relates generally to current limiters, and more particularly to an apparatus for limiting the inrush current of a power converter.

BACKGROUND OF THE INVENTION

A DC power supply unit converts a DC supply voltage, such as that produced from a battery, into a stabilized output voltage by means of a DC voltage converter. In order to reduce voltage fluctuations, an input storage capacitor is typically placed ahead of the DC voltage converter. When the capacitor is completely discharged and the power supply unit is first switched on, a high inrush current flows into the capacitor to charge it. Unless compensated for, this high inrush current causes voltage dips in the DC voltage produced from the battery. Such voltage dips can cause other circuitry energized by the battery to operate incorrectly.

It is also known to place a large capacitor at the output of the DC voltage converter. The large capacitor at the output of the DC voltage converter stores charge that is then utilized under transient conditions. For example, DC converted (or regulated) voltage can be used to power the transmitter circuits of radio frequency (RF) communication equipment. In some RF circuits, such as in cellular telephones, the transmitter RF circuitry operates in pulsed mode, wherein the transmitter must deliver high bursts of power at intermittent times. If the transmitter operates is a pulsed mode, there are times when it must deliver high bursts of power. These large bursts of peak power can cause intermittent excessive battery drain, and therefore voltage dips. One known arrangement employs a large capacitor to store a charge between pulse intervals. The energy stored in the capacitor is used to deliver the peak power required by the transmitter. However, because these large output capacitors have a large capacitance, a large DC charging current (inrush current) is drawn from the capacitor when the input supply is initially switched on. This large inrush current can cause the input battery voltage to dip. The large inrush current can also damage the components of the DC voltage converter. Such voltage dips can cause other circuitry energized by the battery to operate incorrectly. Further, the large inrush current can damage the components of the DC voltage converter connected between the DC voltage supply and the large output capacitor.

Consequently, there is a need to limit the inrush current that can be drawn from the DC voltage supply until input storage/filtering capacitance presented to the DC voltage supply is charged. In addition, there is a need to limit the inrush charging current until the large output capacitance used as a supplemental voltage source during pulsed transmission is charged.

DETAILED DESCRIPTION OF A PREFERRED EMBODIMENT

The present invention provides an apparatus and method for limiting the inrush current to a DC voltage converter. When a power supply voltage is initially applied to a load, the inrush current limiter apparatus advantageously limits the initial charging current. This reduces the current drain on a power supply battery, prevents voltage dips from the battery due to excessive current drain, and protects circuitry which would otherwise be damaged from the unrestricted inrush charging current.

Figure 1:
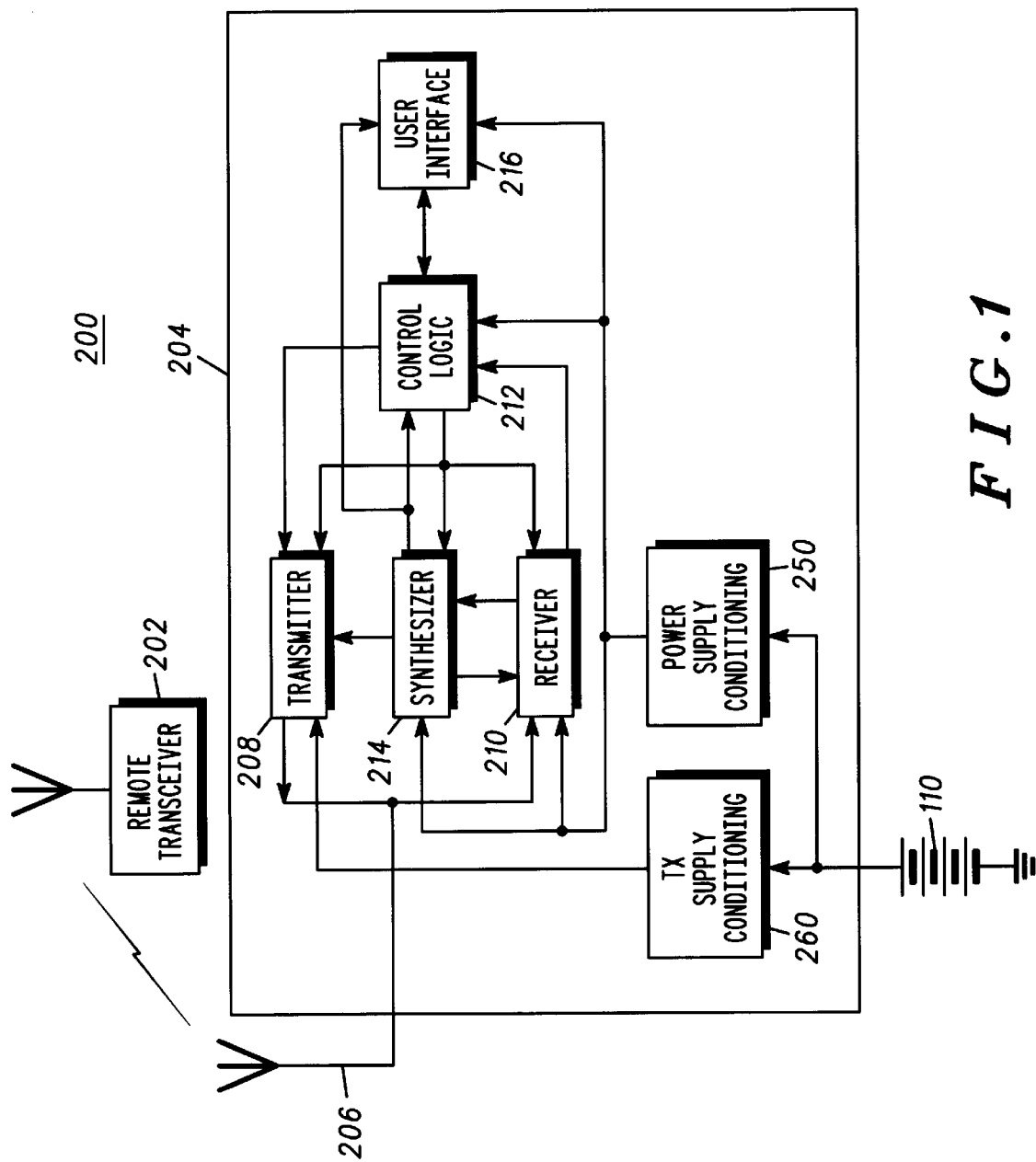
FIG. 1 is a circuit schematic in block diagram form of a radiotelephone which may employ an inrush current limiter apparatus.

FIG. 1 is an illustration in block diagram form of a radio telephone communication system. The radiotelephone communication system 200 includes a remote transceiver 202 and one or more radiotelephones such as radiotelephone 204. The remote transceiver 202 sends and receives RF signals to and from radiotelephones. The radiotelephone communication system 200 can comprise a cellular telephone communication system. In another embodiment, the radiotelephone communication system 200 comprises a satellite communication system.

The radiotelephone 204 is one such radiotelephone contained within the geographic area and includes an antenna 206, a transmitter 208, a receiver 210, a control logic 212, a synthesizer 214, a user interface 216, power supply conditioning circuitry 250, and transmitter supply conditioning circuitry 260.

To transmit REF signals containing information from the radiotelephone 204 to the remote transceiver 202, the user interface 216 directs user input data to the control logic 212. The control logic 212 typically includes a microprocessor, memory, a clock generator, and a power amplifier control circuit. The control logic 212 formats the information obtained from the user interface 216 and conveys it to the transmitter 208 for conversion into RF modulated signals. The transmitter 208 conveys the RF modulated signals to the antenna 206 for transmission to the remote transceiver 202.

The radiotelephone 204 detects RF signals containing data through the antenna 206 and produces detected RF signals. The receiver 210, coupled to the antenna 206, converts the detected RF signals into electrical baseband signals, demodulates the electrical baseband signals, recovers the data, including automatic frequency control information, and outputs the data to the control logic 212. The control logic 212 formats the data into recognizable voice or data information for use by user interface 216. The user interface 216 communicates the received voice or data information to a user. Typically, the user interface 216 includes a microphone, a speaker, a display, and a keypad.

The synthesizer 214 generates RF signals for use by the receiver 210 and the transmitter 208 to allow the reception and transmission of data. Control over functions of the transceiver, such as channel of operation frequency, is provided by the control logic 212, and is applied, in part, to the synthesizer 214 as synthesizer program instructions.

Power supply conditioning circuitry 250 contains conventional power supply circuitry such as voltage regulators and DC-DC converters for conditioning the DC power supply, here battery 110. Transmitter supply conditioning circuitry 260 contains circuitry for conditioning the battery 110 voltage supplied to the power amplifier of transmitter 208.

Figure 2:
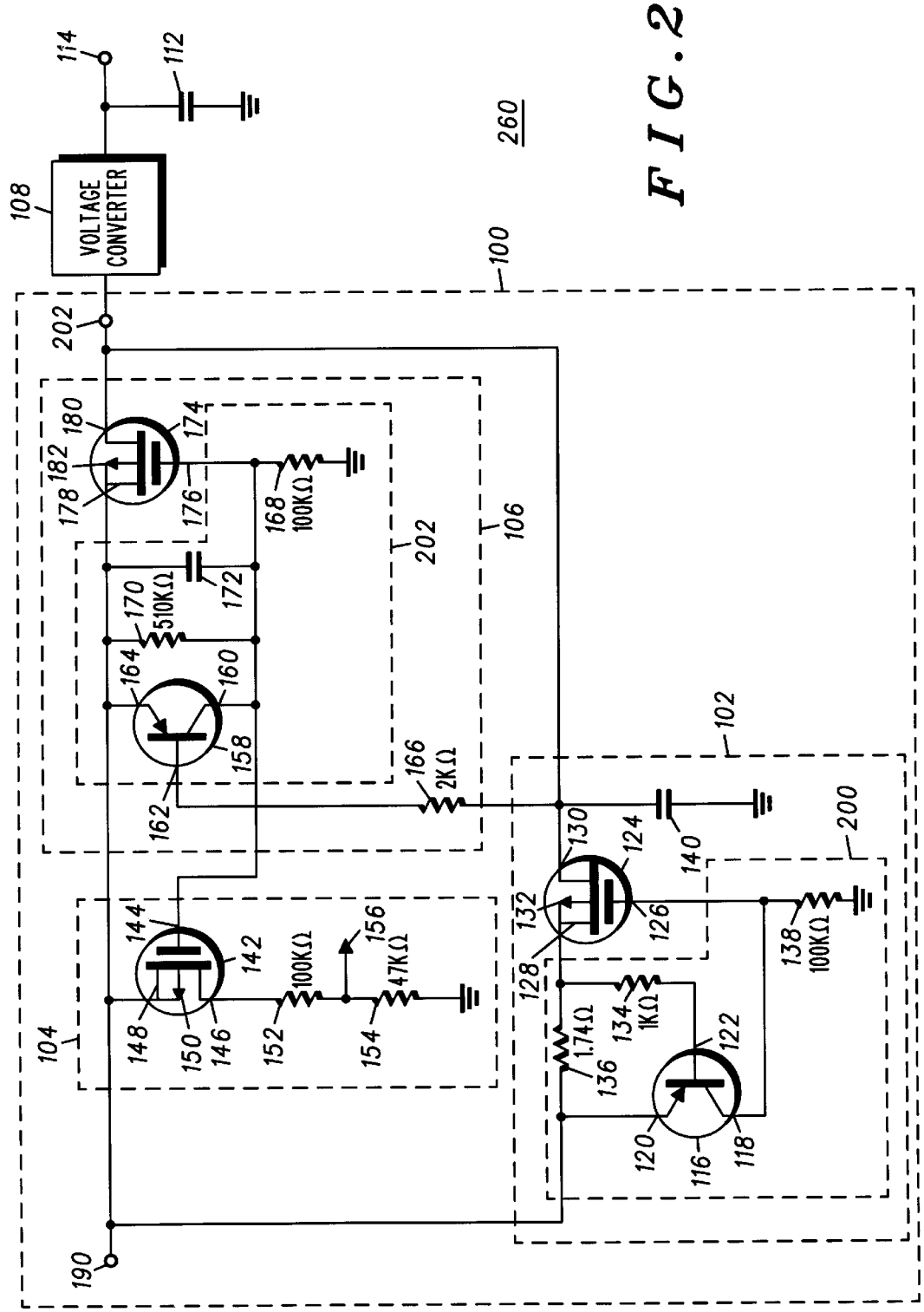
FIG. 2 is a partial circuit diagram and partial block diagram of transmitter supply conditioning circuitry that employs an inrush current limiter apparatus in accordance with the present invention.

FIG. 2 is a partial circuit diagram and partial block diagram of transmitter supply conditioning circuitry 260, here shown to generally comprise an inrush current limiter 100, a DC voltage converter 108, a large value capacitor 112, and an output terminal 114. The voltage produced by battery 110 is applied to input 190 of the inrush current limiter 100, and the output 202 of the inrush current limiter 100 is coupled to a load, shown in the illustrated embodiment to generally comprise a DC voltage converter 108.

In the illustrated embodiment, the DC voltage converter 108 comprises a boost mode converter used to convert a 5.2 volt input voltage to 8 volts at output terminal 114. In alternate embodiments, different battery voltages are applied to input 190 and other voltage conversions are produced by the DC voltage converter 108. In addition, in alternate embodiments the inrush current limiter 100 could be used to drive loads other than a DC voltage converter. Although the inrush current limiter 100 is particularly advantageous when used to regulate the current produced by a battery, it will be recognized by those skilled in the art that the inrush current limiter can be advantageously employed to regulate the current produced by other supplies, such as a regulated power supply.

The output of the DC voltage converter 108 is applied to the large value capacitor 112 that is coupled to the output terminal 114. The large value capacitor 112 is charged to the DC converted voltage. The charge on the large value capacitor 112 is used to assist in supplying power to a power amplifier during peak pulsed power requirements.

The inrush current limiter generally comprises an input 190 for connection to a supply voltage, an output 202 for connection to a load, and a current limiter circuit 102. In the preferred embodiment, the inrush current limiter 100 also comprises a current bypass circuit 106 and a charge status circuit 104.

The current limiter circuit 102 detects a voltage at the output 202 and limits a supply current produced at the output 202 until the voltage at the output 202 reaches a predetermined value. In a preferred embodiment, the predetermined value is substantially equal to the supply voltage presented at the input 190.

The current limiter circuit 102 comprises a variable resistance device 124 that couples the input 190 and the output 202, and the current limiter circuit 102 is used to limit the supply current. A filter capacitor 140 is coupled to the output 202. In addition, the current limiter circuit 102 comprises a control circuit 200 to control the variable resistance device 124. In the preferred embodiment, the control circuit 200 uses the supply current to develop a control signal for controlling the variable resistance device 124.

In the illustrated embodiment, the control circuit 200 comprises a current sampling resistor 136 that couples the input 190 to a feedback resistor 134. The current sampling resistor 136 is for sensing the supply current and generating a current sense voltage. A control device 116 is coupled to the current sampling resistor 136 and is responsive to the current sense voltage. The control device is used to produce a control current. The control device comprises a first lead 120 coupled to the input 190, a second lead 122 coupled to the current sampling resistor 136, and a third lead 118 coupled to a conversion resistor 138. The conversion resistor 138 is used to convert the control current to the control signal.

In the illustrated embodiment, the variable resistance device 124 comprises a transistor having a first lead 132 coupled to a node formed by a joining of the sampling resistor 136 and the feedback resistor 134, a second lead 130 coupled to the output 202, a third lead 126 coupled to receive the control signal developed across the conversion resistor 138, and a substrate lead 128 coupled to the first lead 132. The control device 116 preferably comprises a PNP bipolar transistor and the variable resistance device 124 preferably comprises an enhancement mode P-type FET.

In the illustrated embodiment, the current bypass circuit 106 couples the input 190 to the output 202 for providing a current bypass path that bypasses the current limiter circuit 102 when the voltage at the output 202 reaches a predetermined voltage value. In the preferred embodiment, the current bypass circuit 106 comprises a current bypass device 174 coupled to the input 190 and the output 202. The current bypass device 174 has a first lead 182 coupled to the input 190, a second lead 180 coupled to the output, a third lead 168, and a substrate connection 178 coupled to the first lead 182.

A switch circuit 202 is responsive to the voltage at the output 202 to control the current bypass device 174 and the charge status circuit 104. In the illustrated embodiment, the switch circuit 202 comprises a switch device 158 coupled to the input 190 and the output 202 to control the current bypass device 174. The switch device 158 has a first lead 164 coupled to the input 190, a control lead 162 coupled to the output through switch resistor 166, and a third lead 160. A first voltage divider resistor 170 couples the input 190 to the third lead 160, and a race capacitor 172 is connected in parallel to the first voltage divider resistor 170. A second voltage divider resistor 168 is coupled to the first voltage divider resistor 170 for producing a switch control signal. The control signal is coupled to the third lead 176 of the current bypass device 174. The race capacitor 172 is to effect a turn-on characteristic of the current bypass circuit 106 and the current limiter circuit 102. Preferably, the current bypass device 174 comprises an enhancement mode P-type FET, and the switch device 158 comprises a PNP bipolar transistor.

In the illustrated embodiment, the charge status circuit 104 is coupled to the input 190 to provide a signal representative of the supply voltage present at the input 190. In the preferred embodiment, the charge status circuit 104 comprises a charge status switch 142 coupled to the input 190, and a voltage divider resistor pair (third voltage divider resistor 152 and fourth voltage divider resistor 154) coupled to the charge status switch 142.

The charge status switch 142 has a control lead 144 coupled to the node formed at the joining of the first voltage divider resistor 170 and the second voltage divider resistor 168, a substrate connection 148 and a lead 150 coupled to the input 190, and a lead 146 coupled to the third voltage divider resistor 152. The fourth voltage divider resistor 154 is coupled to the third voltage divider resistor 152, and a charge monitor output 156 is located at a node formed at a joining of the third voltage divider resistor 152 and the fourth voltage divider resistor 154. Preferably the charge status switch 142 comprises an enhancement mode P-type FET.

When the input voltage from battery 110 is first applied to input 190, there is no charge stored on filter capacitor 140 and large value capacitor 112. The voltage across both capacitors is therefore close to zero volts, and the DC voltage converter 108 is not yet activated. Since there is no charge on the capacitors, a voltage potential is developed from the input 190 to the output 202 that is substantially equal to the input voltage appearing at input 190. A sudden, large supply current is developed to charge the two capacitors. The race capacitor 172 insures that when the input voltage from battery 110 is first applied to input 190, the current bypass device 174 stays in the high resistance mode, thereby allowing the current limiter circuit 102 to activate first.

The first lead 164 of the switch device 158 is tied to the input voltage, and the control lead 162 is coupled to the output 202. When the inrush current limter 100 is operating in the current limit mode, the control lead 162 is at a voltage potential that is substantially equal to the input voltage appearing at input 190 minus the emitter-base junction potential of the switch device 158. This is because the control lead 162 is coupled to the uncharged capacitors 140 and 112 through the output 202. The switch device 158, shown in the illustrated embodiment as a PNP transistor, is therefore forward biased into the saturation region. A PNP transistor operating in the saturation region acts substantially like a closed switch, and the voltage developed across the first lead 164 to the third lead 160 is substantially 0.2 volts.

The substantially 0.2 volts is applied across the first lead 178 and the third lead 176 of the current bypass device 174. In the illustrated embodiment, the first lead 178 and the third lead 176 of the current bypass device 174 comprises the source and gate, respectively, of a P-type enhancement FET. The current bypass device is thus substantially biased to the cut-off region of operation to form an open circuit. During this mode operation, the capacitors 140 and 112 are being charged, and substantially no current passes from the input 190 to the output 202 through the current bypass circuit 106.

Therefore, during the initial charging of capacitors 140 and 112, the supply current passes through the current limiter circuit 102. The supply current passes through the current sampling resistor 136 to develop a voltage drop, also referred to as the current sense voltage. The current sense voltage is applied across the first lead 120 and the second lead 122 of the control device 116, and the control device 116 generates a control current in response to the current sense voltage. The control current passes through the conversion resistor 138 to generate a voltage drop referred to as a control signal. The control signal is coupled to the third lead 126 of the variable resistance device 124. In the illustrated embodiment, the variable resistance device comprises a p-type enhancement mode FET, and the third lead 126 comprises the gate of the FET. The control signal applied to the gate 126 causes the resistance ($R_{DS}$ drain to source resistance of the FET) to increase, and the supply current decreases due to the increased resistance in the current path from input 190 to output 202.

The increased series resistance resulting from variable resistance device 124 causes the supply current to decrease, and the voltage drop developed across the current sampling resistor 136 therefore decreases. The decreasing voltage drop across current sampling resistor 136 thereby causes the control current produced by the control device 116 to decrease, since the voltage applied across the emitter-base junction is decreased. The decreased control current causes a decrease in the voltage of the control signal developed across the conversion resistor 138. The decrease in the voltage of the control signal causes the voltage applied to the gate 126 to decrease to cause the series resistance of the variable resistance device 124 to decrease. This feedback mechanism causes the supply current to be limited to a predetermined value during the mode of operation where the capacitors 140 and 112 are being charged.

In the illustrated embodiment, the values of resistors 136, 134, and 138 are chosen so that when they are combined with the PNP bipolar control device 116 and the FET variable resistance device 124, the current is regulated to substantially 344 mA. In the linear region of operation, the PNP bipolar control device 116 has a emitter-base internal junction potential of substantially 0.6 V, and 0.6 volts divided by 1.74 Ω yields substantially 344 mA.

The limited current is maintained by the current limiter circuit 102 comprising the feedback loop, and the two capacitors 140 and 112 are charged by the limited current. While the current limiter circuit 102 is active and the supply current is being limited, the voltage developed across the sampling resistor 136 keeps the switch device 158 in the saturation mode of operation. With the switch device 158 maintained in the saturation mode, the current bypass device 174 is maintained in the cut-off region of operation, thereby acting as an open circuit.

In the illustrated embodiment, when the capacitors 140 and 112 are charged to substantially the input voltage minus the emitter-base junction potential of the switch device 158, the boost-mode converter 108 starts converting the input voltage to the desired output voltage. The current passing through the current limiter circuit 102 is now substantially reduced since very little voltage is developed across sampling resistor 136. With the small voltage developed across sampling resistor 136, the control device 116 is biased substantially off and produces substantially no control current. The gate 126 of the variable resistance device 124 is pulled substantially to ground potential, thereby biasing the variable resistance device 124 to its minimum $R_{DS}$ on resistance. Thus, after the capacitors 140 and 112 are charged, very little current passes through the current limiter circuit 102, and the variable resistance device 124 is set to its minimum resistance setting.

When the capacitors 140 and 112 are charged, the voltage at output 202 is substantially equal to the input voltage 190, and substantially no voltage is developed across the emitter-base junction of the switch device 158. The switch device 158 is therefore switched from operating in the saturation mode to the cutoff mode (i.e. biased essentially off). With the switch device 158 biased substantially off, the input voltage appearing at input 190 is divided down through the first voltage divider resistor 170 and the second voltage divider resistor 168, and the voltage appearing at gate 176 of the current bypass device 174 is thus pulled towards ground potential. In the illustrated embodiment, the input voltage is substantially 5.2 Volts, and the first and second voltage divider resistors thus pull the voltage appearing at gate 176 to substantially 0.85 Volts.

When the gate 176 is pulled towards ground potential, the current bypass device 174 is set to its minimum $R_{DS}$ on-resistance mode of operation. In the minimum $R_{DS}$ mode of operation, the variable resistance device 174 couples the input 190 to the output 202 through the small $R_{DS}$. Therefore, after capacitors 140 and 112 are charged, the current limiter circuit is bypassed and substantially all of the supply current passes through the current bypass circuit 106.

The DC voltage converter 108 is switched on when the voltage appearing at the output 202 reaches a predetermined value. In the illustrated embodiment, the DC voltage converter switches on when the voltage at output 202 is substantially 1 volt less than the input voltage appearing at input 190.

Since the control lead 144 of the charge status switch 142 is coupled to the third lead 176 of the current bypass device 174, the charge status switch 142 operates similar to the current bypass device 174. When the supply current is being limited through the current limiter circuit 102, the source-gate voltage applied to the charge status switch 142 is substantially 0.2 V, and the charge status switch 142 is biased to the cut-off region to form an open circuit. With no current flowing through third and fourth voltage divider resistors, 152 and 154 respectively, the charge monitor node 156 is pulled towards ground potential and reads substantially 0 V.

When the current bypass device 174 is turned on to its minimum resistance state, the charge status switch 142 is switched to its minimum resistance state. A trickle current passes through the third and fourth voltage divider resistors 152 and 154 so that a voltage is developed at the charge monitor node 156 that is representative of the input voltage appearing at input 190.

The inrush current limiter in accordance with the present invention advantageously provides a mechanism for limiting the initial charging current of filtering capacitors used for a DC voltage converters. The regulation of the charging current substantially reduces fluctuations in battery voltage which would otherwise be caused by the large, unregulated, inrush charging current. Limiting the inrush current to prevent battery voltage fluctuations enables other circuitry that uses the battery voltage to operate more reliably. In addition, the inrush current limiter further advantageously limits the charging current necessary to initially charge large valued capacitors that can be present at the output of a DC voltage converter. Further, the inrush current limiter protects the circuitry of the DC voltage converter from being damaged by a large inrush current that would otherwise result if the inrush current limiter was not utilized.

The inrush current limiter in accordance with the present invention advantageously operates based on current load sensing and output voltage sensing to determine when a transition should be made from the current limit mode to the current bypass mode of operation. This is preferable to relying on a timing circuit to determine when the transition should be made. An inrush current limiter relying on a timing circuit has limited flexibility when applying the inrush current limiter to different systems. This is because different systems have different load capacitances and thus different charging times. An inrush current limiter relying on a timing circuit would have to be adjusted when it is applied to different systems with the different load capacitances. The inrush current limiter in accordance with the present invention does not have this limitation since it is self-adapting to different load conditions through the use of current and voltage sensing.

The previous description of the preferred embodiments are provided to enable any person skilled in the art to make or use the inrush current limiter apparatus. Various modifications to these embodiments will be readily apparent to those skilled in the art, and the generic principles defined herein may be applied to other embodiments without the use of the inventive faculty.

What is claimed is:

1. An inrush current limiter comprising:
    an input for connection to a supply voltage;
    an output for connection to a load;
    a current limiter circuit coupling the input to the output, the current limiter circuit for detecting a voltage difference between the input and the output and limiting a supply current, applied at the input and passing through the current limiter circuit, in response to the voltage difference between the input and the output, the current limiter circuit for substantially stopping limiting the supply current responsive to the voltage difference between the input and the output decreasing to substantially a predetermined amount; and
    a current bypass circuit coupled in parallel with the current limiter circuit for providing a current bypass path that bypasses the current limiter circuit, the current bypass circuit representing a substantially open circuit in response to the voltage difference between the input and the output being substantially greater than the predetermined amount so that substantially none of the supply current passes through the current bypass circuit, the current bypass circuit representing a substantially short circuit in response to the voltage difference between the input and the output decreasing to the substantially predetermined amount so that substantially all of the supply current passes through the current bypass circuit.

2. The inrush current limiter as defined in claim 1, wherein the current limiter circuit comprises a variable resistance device coupling the input and the output for presenting a series resistance between the input and the output, the variable resistance device for varying the series resistance for maintaining the supply current to substantially a predetermined value in response to the voltage difference between the input and the output.

3. The inrush current limiter as in claim 2, wherein the variable resistance device comprises a field effect transistor.

4. The inrush current limiter as defined in claim 2, wherein the current limiter circuit further comprises a control circuit coupled to the input and the current limiter circuit, the control circuit for producing a control signal responsive to the supply current passing through the current limiter circuit for varying the series resistance.

5. The inrush current limiter as in claim 4, wherein the control circuit comprises a bipolar transistor.

6. The inrush current limiter as defined in claim 4, wherein the control circuit comprises:
    a current sampling resistor coupled to the input, the current sampling resistor for sensing the supply current and generating a current sense voltage;
    a control device coupled to the current sampling resistor, the control device responsive to the current sense voltage and producing a control current; and
    a conversion resistor for converting the control current to the control signal.

7. The inrush current limiter as defined in claim 1, wherein the current bypass circuit comprises a current bypass device coupling the input and the output, the current bypass device for switching between a low impedance on state and a higher impedance off state in response to the voltage difference between the input and the output.

8. The inrush current limiter as in claim 7, wherein the current bypass device comprises a field effect transistor.

9. The inrush current limiter as defined in claim 7, wherein the current bypass circuit further comprises a switch circuit for producing a current bypass device control voltage responsive to the voltage difference between the input and the output, the current bypass device control voltage for switching the current bypass device to the higher impedance off state in response to the voltage difference between the input and the output being greater than the predetermined amount and for switching the current bypass device to the low impedance on state in response to the voltage difference between the input and the output decreasing to substantially the predetermined amount.

10. The inrush current limiter as defined in claim 9, wherein the switch circuit further comprises a switch device coupled to the input and the output, the switch device for producing the current bypass device control voltage in response to the voltage difference between the input and the output.

11. The inrush current limiter as in claim 10, wherein the switch device comprises a bipolar transistor.

12. An inrush current limiter comprising:

an input for connection to a supply voltage;

an output for connection to a load;

a current limiter circuit coupling the input to the output, the current limiter circuit for detecting a voltage difference between the input and the output and limiting a supply current, applied at the input and passing through the current limiter circuit, in response to the voltage difference between the input and the output, the current limiter circuit substantially stopping limiting the supply current responsive to the voltage difference between the input and the output decreasing to substantially a predetermined amount; and a charge status circuit coupled to the input for providing a signal representative of an input voltage present at the input.

13. The inrush current limiter as in claim 12, wherein the charge status circuit further comprises:

a charge status switch coupled to the input and responsive to the voltage at the output; and a voltage divider resistor pair coupled to the charge status switch.

14. A radiotelephone comprising:

control logic for controlling the radiotelephone;

a synthesizer coupled to the control logic for generating RF signals;

a transmitter coupled to the synthesizer for transmitting information using the RF signals;

a receiver coupled to the synthesizer for receiving data using the RF signals; and a power supply conditioning circuit for conditioning a supply voltage applied to the radiotelephone, the power supply conditioning circuit for powering the control logic, the synthesizer, the transmitter, and the receiver, the power supply conditioning circuit including:

an input for connection to the supply voltage;

an output for connection to a load;

a current limiter circuit coupled to the input and the output, the current limiter circuit for detecting a voltage difference between the input and the output and limiting a supply current applied at the input and passing through the current limiter circuit, the current limiter circuit limiting the supply current in response to the voltage difference between the input and the output, the current limiter circuit substantially stopping limiting the supply current responsive to the voltage difference between the input and the output decreasing to substantially a predetermine amount, the current limiter circuit including a variable resistance device coupling the input and the output for presenting a series resistance between the input and the output, the variable resistance device varying the series resistance to maintain the supply current to substantially a predetermined value in response to the voltage difference between the input and the output, the current limiter circuit including a control circuit coupled to the input, the control circuit for producing a control signal responsive to the supply current passing through the current limiter circuit to vary the series resistance, the control circuit including a current sampling resistor coupled to the input, the current sampling resistor for sensing the supply current and generating a current sense voltage, a control device coupled to the current sampling resistor, the control device responsive to the current sense voltage and producing a control current, and a conversion resistor for converting the control current to the control signal; and a current bypass circuit coupled to the input and the output for providing a current bypass path that bypasses the current limiter circuit in response to the voltage difference between the input and the output, wherein the current bypass circuit causes substantially all of the supply current to pass through the current bypass circuit rather than the current limiter circuit resonsive to the voltage difference between the input and the output decreasing to substantially the predetermine amount.

15. A radiotelephone comprising:

control logic for controlling the radiotelephone;

a synthesizer coupled to the control logic and for generating RF signals;

a transmitter coupled to the synthesizer, the transmitter for transmitting information using the RF signals;

a receiver coupled to the synthesizer, the receiver for receiving data using the RF signals; and a power supply conditioning circuit for conditioning a supply voltage applied to the radiotelephone, the power supply conditioning circuit for powering the control logic, the synthesizer, the transmitter, and the receiver, the power supply conditioning circuit including:

an input for connection to the supply voltage;

an output for connection to a load;

a current limiter circuit coupled to the input and the output, the current limiter circuit for detecting a voltage difference between the input and the output and limiting a supply current applied at the input and passing through the current limiter circuit, the current limiter circuit for limiting the supply current in response to the voltage difference between the input and the output, the current limiter circuit for substantially stopping limiting the supply current responsive to the voltage difference between the input and the output decreasing to substantially a predetermine amount; and a charge status circuit coupled to the input, the charge status circuit for providing a signal representative of the supply voltage present at the input.

16. The radiotelephone as defined in claim 15, wherein the charge status circuit further comprises:

a charge status switch coupled to the input and responsive to the voltage at the output; and a voltage divider resistor pair coupled to the charge status switch.

* * * * *